United States Patent [19]
Nadehara

[11] Patent Number: 5,784,305
[45] Date of Patent: Jul. 21, 1998

[54] MULTIPLY-ADDER UNIT

[75] Inventor: Kouhei Nadehara, Tokyo, Japan

[73] Assignee: NEC Corporation, Tokyo, Japan

[21] Appl. No.: 640,701

[22] Filed: May 1, 1996

[30] Foreign Application Priority Data

May 1, 1995 [JP] Japan ................................ 7-131048
May 29, 1995 [JP] Japan ................................ 7-153915

[51] Int. Cl.$^6$ ................................................ G06F 7/38
[52] U.S. Cl. .......................................... 364/736.02
[58] Field of Search ...................... 364/736.02, 748.07, 364/757

[56] References Cited

U.S. PATENT DOCUMENTS

| | | | |
|---|---|---|---|
| 4,852,037 | 7/1989 | Aoki | 364/736.02 |
| 5,343,416 | 8/1994 | Eisig et al. | 364/757 |
| 5,583,804 | 12/1996 | Seal et al. | 364/736.02 |
| 5,659,495 | 8/1997 | Briggs et al. | 364/736.02 |

FOREIGN PATENT DOCUMENTS

| | | |
|---|---|---|
| 4-205624 | 7/1992 | Japan . |
| 4-252332 | 9/1992 | Japan . |

OTHER PUBLICATIONS

Neil H.E. Weste et al., *Principles of CMOS VLSI Design: A Systems Perspective*, AT&T, pp. 547–555 (1983).
C.S. Wallace, "A Suggestion for a Fast Multiplier", *IEEE Transactions on Electronic Computers* EC–13(1): 14–17 (1964).

*Primary Examiner*—Reba I. Elmore
*Assistant Examiner*—Robert J. Dolan
*Attorney, Agent, or Firm*—Foley & Lardner

[57] ABSTRACT

The invention provides a multiply-adder unit which has a reduced number of inputs to an adder tree to allow reduction of the amount of hardware and high speed operation. A bit width extender performs, upon unsigned operation, zero extension of one bit but performs, upon signed operation, sign extension of one bit for a multiplicand. A zero extender performs zero extension of 2 bits for a multiplier. A Booth's decoder cuts out an output of the zero extender in units of 3 bits successively shifting its cut-out start position by 2 bits toward the lower bits beginning with the uppermost bit and generates first to (k–1)th partial products and a kth partial product based on the cut out values and the output of the bit width extender. A selector selects, upon unsigned operation, the kth partial product but selects, upon signed operation, the output of the sign extender (addend after sign extension). A k-input adder tree adds the first to (k–1)th products and the output of the selector.

8 Claims, 13 Drawing Sheets

FIG.4

PRIOR ART

| NUMBER (k') OF INPUTS TO ADDER TREE | NUMBER OF STAGES OF CSAs IN ADDER TREE |
|---|---|
| 3 | 1 |
| 4 | 2 |
| $5 \leq k' \leq 6$ | 3 |
| $7 \leq k' \leq 9$ | 4 |
| $10 \leq k' \leq 13$ | 5 |
| $14 \leq k' \leq 19$ | 6 |
| $20 \leq k' \leq 28$ | 7 |
| $29 \leq k' \leq 42$ | 8 |
| $43 \leq k' \leq 63$ | 9 |

FIG.9

| y(2I+1) | y2j | y(2j-1) | Yj |
|---|---|---|---|
| 0 | 0 | 0 | 0 |
| 0 | 0 | 1 | 1 |
| 0 | 1 | 0 | 1 |
| 0 | 1 | 1 | 2 |
| 1 | 0 | 0 | -2 |
| 1 | 0 | 1 | -1 |
| 1 | 1 | 0 | -1 |
| 1 | 1 | 1 | 0 |

FIG. 10

| $Y_j$ | $P_j$ | PRODUCTION METHOD | $P_{ji}$ | $C_j$ |
|---|---|---|---|---|
| 2 | 2X | SHIFT X BY 1 BIT LEFTWARDS | $x_{(i-1)}$ | 0 |
| 1 | X | MAINTAIN X | $x_i$ | 0 |
| 0 | 0 | PLACE 0 TO ALL BITS | 0 | 0 |
| -1 | -X | CALCULATE TWO'S COMPLEMENT OF X | $\overline{x_i}$ | 1 |
| -2 | -2X | SHIFT X BY 1 BIT LEFTWARDS & CALCULATE TWO'S COMPLEMENT | $\overline{x_{(i-1)}}$ | 1 |

WHERE $X_{-1}=0$

MULTIPLY-ADDER UNIT

BACKGROUND OF THE INVENTION

1. Field of the Invention

This invention relates to a multiply-adder unit, and more particularly to a multiply-adder unit which performs signed multiplication, unsigned multiplication and signed fixed point multiply addition based on the Booth's method. It is to be noted that, in the present specification, signed multiplication and signed fixed point multiply addition may be referred to as "signed operation" and unsigned multiplication may be referred to as "unsigned operation".

2. Description of the Related Art

Conventionally, general purpose microprocessors adopted in personal computers, engineering workstations and like equipment has, in a instruction set, a signed multiplication instruction for performing signed multiplication and an unsigned multiplication instruction for performing unsigned multiplication.

In recent years, however, the demand that digital signal processing be performed at a high speed has arisen for compression, decompression and other required processing of audio and/or video signals.

Accordingly, microprocessors which have, in addition to the existing instruction set (instruction set including signed/unsigned multiplication instructions) mentioned above, a signed fixed point multiply-add instruction for performing signed fixed point multiply addition which is used frequently in digital signal processing are prevailing recently.

The addition of the signed fixed point multiply addition instruction to the instruction set for a microprocessor provides the following advantage. In particular, owing to the addition of the signed fixed point multiply-add instruction, processing which is conventionally performed by two commands of a signed multiplication instruction and a signed addition instruction can be performed only by the signed fixed point multiply-add instruction (that is, only by one instruction). Consequently, the speed of digital signal processing can be raised remarkably.

The present invention is directed to a multiply-adder unit which is built in such a microprocessor as described just above (processor having an improved signal processing performance), and particularly to a multiply-adder unit which has a signed fixed point multiply addition function in addition to signed and unsigned multiplication functions.

Here, it is assumed that a multiply-adder unit to which the present invention is directed receives, as inputs thereto, a multiplicand X of n-bit length (n is a positive even number such as, for example, 16 or 32), a multiplier Y of n-bit length and an addend Z of n-bit length.

A multiply-adder unit of the type mentioned requires such processing as described in ① and ② below.

① When signed multiplication is performed (when a signed multiplication instruction is executed) or when unsigned multiplication is performed (when an unsigned multiplication instruction is executed), signed or unsigned multiplication of X and Y is performed and a result R of 2n-bit length is outputted.

② When signed fixed point multiply addition is performed, signed multiplication of X and Y is performed to obtain an intermediate result of 2n-bit length, and the addend Z is signed-added to the upper n bits of the intermediate result and a result R of (2n+1)-bit length is outputted. It is to be noted that the fixed point number expression adopted by a multiply-adder unit to which the present invention is directed is an expression in which the decimal point is fixed to the uppermost bit side.

One of conventional multiply-adder units which realize such processing (functions) as described above is disclosed in Japanese Patent Laid-Open Application No. Heisei 4-252332 ("Multiply addition method and apparatus").

The multiply-adder unit disclosed in the document mentioned just above will be described below with reference to FIG. 3.

The multiply-adder unit shown in FIG. 3 includes a first bit width extender 101, a second bit width extender 102, a Booth's decoder 103, and a (k+1)-input adder tree 104 (the value of k will be hereinafter described).

The multiply-adder unit performs signed multiplication using the Booth's decoder 103. Details of the construction of the Booth's decoder are disclosed in Neil H. E. Weste et al., "PRINCIPLES OF CMOS LSI DESIGN. A Systems Perspective, second edition", Addison-Wesley Publishing Company, ISBN 0-201-53376-6, pp. 547–555 (hereinafter referred to as document 1).

Here, the basic idea of the Booth's decoder will be described (the expressions in the idea will be introduced also in the description of the preferred embodiments of the present invention).

Now, it is assumed that it is intended to obtain the product P' (P'=X'×Y') of a signed multiplicand X' of m-bit length (m is a natural number) and a signed multiplier Y' of m-bit length.

If the bits of the multiplier Y' are represented by $y_i'$ (i is an integer which satisfies $0 \leq i < m$) and j is set as given by $$j = [m/2 + 0.5] \quad (1)$$

where [ ] is a Gauss' notation, then Y' can be re-written as follows:

① when m is an even number, $$Y' = \sum_{i=0}^{j-1} Y_i \cdot 2^{2i} \quad (2)$$

where $$Y_i' = -2y'_{(2i+1)} + y'_{2i} + y'_{(2i-1)} \quad (3)$$

where $$y'_{-1} = 0 \quad (4)$$

② when m is an odd number, $$Y' = \sum_{i=0}^{j-1} Y_i \cdot 2^{(2i-1)} \quad (5)$$

where $$Y_i' = -2y'_{2i} + y'_{(2i-1)} + y'_{(2i-2)} \quad (6)$$

where $$y'_{-1} = y'_{-2} = 0 \quad (7)$$

$Y_i'$ defined by equation (3) or (6) assumes one of the values of -2, -1, 0, 1 and 2 depending upon a combination of three of bits of Y' (including $y'_{-1}$ and $Y'_{-2}$).

The product P' to be obtained is represented in the following manner:

$$P' = X' \times Y'  \quad (8)$$

$$= \sum_{i=0}^{j-1} X' \cdot Y_i \cdot 2^{2i} \quad \text{when } m \text{ is an even number}$$

$$= \sum_{i=0}^{j-1} X' \cdot Y_i \cdot 2^{(2i-1)} \quad \text{when } m \text{ is an odd number}$$

Accordingly, the product P' can be obtained by producing j partial products of (m+1)-bit length $$P_i' = X' \times Y_i' \quad (9)$$

(although i is an integer which satisfies $0 \leq i < m$ as described above, here $0 \leq i < j$) and then adding the partial products $P_i'$ by means of a j-input adder tree.

The Booth's decoder produces j partial products $P_i'$ of (m+1)-bit length mentioned above.

Subsequently, operation of the multiply-adder unit of FIG. 3 having such a Booth's decoder (Booth's decoder 103) as described above will be described.

First, operation when unsigned multiplication is performed will be described.

The first bit width extender 101 receives an unsigned multiplicand X of n-bit length as an input thereto and refers to a sign switch bit (information of 1-bit length representative of whether signed operation should be performed or unsigned operation should be performed; in this instance, the bit represents that unsigned operation should be performed) to perform zero extension of an upper 1 bit for a multiplier Y.

The second bit width extender 102 receives an unsigned multiplier Y of n-bit length as an input thereto and refers to the sign switch bit which represents that unsigned operation should be performed to perform zero extension of an upper 1 bit for the multiplier Y.

The Booth's decoder 103 receives the output of the first bit width extender 101 and the output of the second bit width extender 102 as inputs thereto and produces first to kth partial products by means of first to kth partial product generators, respectively. It is to be noted that the Booth's decoder 103 performs its processing, also upon unsigned operation, treating the output of the first bit width extender 101 and the output of the second bit width extender 102 as signed numbers). k which represents the number of partial products in this instance is the value of j when m=n+1 in equation (1), and k=[(n+1)/2+0.5]. Further, since (n+1) is an odd number, in order to obtain partial products, $Y_i'$ represented by equation (6) are used.

The (k+1)-input adder tree 104 receives the k partial products together with a signed addend Z of n-bit length (receives totaling (k+1) values, that is, [(n+1)/2+0.5]+1 values) as inputs thereto and outputs a result R representative of addition of Z to a result of multiplication of X and Y.

Subsequently, operation when signed fixed point multiply addition is performed will be described.

The first bit width extender 101 receives a signed multiplicand X of n-bit length as an input thereto and refers to the sign switch bit which represents that signed operation should be performed to perform sign extension of an upper 1 bit for a multiplier Y.

The second bit width extender 102 receives a signed multiplier Y of n-bit length as an input thereto and refers to the sign switch bit which represents that signed operation should be performed to perform sign extension of an upper 1 bit for the multiplier Y.

The Booth's decoder 103 receives the output of the first bit width extender 101 and the output of the second bit width extender 102 as inputs thereto and produces first to kth partial products by means of first to kth partial product generators, respectively. k which represents the number of partial products in this instance is the value of j when m=n+1 in equation (1), and k=[(n+1)/2+0.5]. Further, since (n+1) is an odd number, in order to obtain partial products, $Y_i'$ represented by equation (6) are used.

The (k+1)-input adder tree 104 receives the k partial products together with a signed addend Z of n-bit length (receives totaling (k+1) values, that is, [(n+1)/2+0.5]+1 values) as inputs thereto and outputs a result R representative of addition of Z to a result of multiplication of X and Y.

It is to be noted that, when signed multiplication is performed, the operation to be performed when signed fixed point multiply addition is performed after 0 is inputted as the addend Z.

Since a multiply-adder unit of the construction described above (multiply-adder unit disclosed in Japanese Patent Laid-Open Application No. Heisei 4-252332) performs, in addition processing of partial products, also addition of an addend Z simultaneously, the multiply addition can be performed at a higher speed than prior multiply-adder units.

With the conventional multiply-adder unit described above, an adder tree having, in both of signed operation and unsigned operation, a number of inputs equal to the sum of the number of partial products produced by a Booth's decoder (in FIG. 3, the Booth's decoder 103) and 1 (in FIG. 3, (k+1) inputs, that is, [(n+1)/2+0.5]+1 inputs) must be prepared. Consequently, the conventional multiply-adder unit is disadvantageous in that an increase of the number of inputs to the adder tree complicates the construction of the adder tree and gives rise to an increase of the hardware amount and a delay in operation.

For example, the multiply-adder unit shown in FIG. 3 where n=16 is considered. In this instance, k+1=[(16+1)/2+0.5]+1=10, and accordingly, a 10-input adder tree must be prepared. According to the construction of an adder tree well known as the Wallace's method (which is disclosed, for example, in C. S. Wallace, "A Suggestion for a Fast Multiplier", IEEE Transactions on Computers, Vol. EC-13, No. 1, Feb. 1964, pp.14–17), in order to implement a 10-input adder tree, carry save adders (CSAs) of 5 stages and a carry propagation adder are required. In contrast, in order to construct a 9-input adder tree having a less input number by 1, only CSAs of four stages and a carry propagation adder are required. It is to be noted that FIG. 4 illustrates a relationship between the number (k') of inputs to an adder tree and the number of stages of CSAs in the construction of an adder tree mentioned above.

Although the increase of the number of inputs to an adder tree and the increase of the number of stages of CSAs are not necessarily be linked with each other (refer to FIG. 4), anyway an increase of the number of inputs to an adder tree gives rise to complication in construction of the adder tree and delay of operation, resulting in a disadvantage that this makes an obstacle to reduction in hardware amount and also to an increase in speed of multiply addition.

Subsequently, a multiply-adder unit to which a signed multiplicand X of 32-bit length, a signed multiplier Y of 32-bit length and an addend Z of 32-bit length are inputted will be considered. It is assumed that the multiplicand X is either a value obtained by sign extension of an arbitrary signed number of 32-bit length to a number of 33-bit length or an arbitrary positive number of 32-bit length.

In a multiply-adder unit of the type just mentioned, such processing as described in ① and ② below is required (refer to FIG. 8). It is to be noted that a fixed point expression adopted in a multiply-adder unit to which the present invention is directed is an expression in which the decimal point is fixed to the uppermost bit side.

① Signed multiplication of the multiplicand X and the multiplier Y is performed to obtain an intermediate result of 65-bit length.

② A value of 33-bit length obtained by sign extension of the addend Z by one bit is added to the upper 33 bits of the intermediate result to obtain a result R of 65-bit length, and the result R is outputted.

As a "technique of performing multiplication" by a multiply-adder unit of the type mentioned, a technique is usually employed wherein a plurality of partial products are generated from part of the multiplier Y and the entire multiplicand X by means of a Booth's decoder and the partial products thus generated are added by means of a CSA tree.

Also a basic idea of the technique is disclosed in document 1 mentioned hereinabove. The basic concept will be described below with reference to FIGS. 9 and 10.

Now, it is assumed that it is tried to obtain the product P ($P=X \times Y$) of a signed multiplicand X of 33-bit length and a signed multiplier Y of 33-bit length.

Where the bits of the multiplicand X and the multiplier Y (the ith bits (i is 0 or a positive integer) when the lowermost bit is represented as the 0th bit) are represented by $x_i$ and $y_i$, respectively, the multiplicand X and the multiplier Y are represented by the following equations:

$$X = -x_{32} \cdot 2^{32} + \sum_{i=0}^{31} x_i \cdot 2^i \quad (10)$$

$$Y = -y_{31} \cdot 2^{31} + \sum_{i=0}^{30} y_i \cdot 2^i \quad (11)$$

If the multiplier Y is divided in units of 3 bits in the following manner by a Booth's decoder, then the multiplier Y can be re-written as follows:

$$Y = \sum_{j=0}^{15} Y_j \cdot 2^{2j} \quad (12)$$

where $$Y_j = -2y_{(2j+1)} + y_{2j} + y_{(2j-1)} \quad (13)$$

where $y_{-1}=0$.

$Y_j$ (j=−1, 0 or a positive integer) defined by expression (13) assumes one of the values of −2, −1, 0, 1 and 2 depending upon a combination of three bits of the bits (including $y_{-1}$) of the multiplier Y. In other words, even if all possible combinations (combinations of 0 and 1) of three bits of $Y_{(2j+1)}$, $Y_{2j}$ and $y_{(2j-1)}$ are examined, $Y_j$ only assumes one of the five values specified above as seen from FIG. 9.

The product P to be obtained is represented as follows:

$$P = X \times Y = \sum_{j=0}^{15} X \cdot Y_j \cdot 2^{2j} \quad (14)$$

Here, if $P_j$ is set as $$P_j = X \cdot Y_j$$

then $P_j$ can be generated for the values of $Y_j$ by the method (generation method) illustrated in FIG. 10. In particular, when the value of $Y_j$ is in the negative, a two's complement of the multiplicand X can be obtained by inverting the bits $x_i$ of the multiplicand X and then adding $c_j=1$.

If this $P_j$ is represented in units of a bit, it can be represented as given by the following equation (for $P_{ji}$ and $c_j$ in the equation, refer to FIG. 10):

$$P_j = -p_{j33} \cdot 2^{33} + \sum_{i=0}^{32} p_{ji} \cdot 2^i + c_j \quad (15)$$

Since the multiplicand X has 33-bit length and $Y_j$ is −2, −1, 0, 1 or 2, $P_j$ may have 34-bit length in the maximum.

Subsequently, a procedure of adding an addend Z to the product P obtained in such a manner as described above to obtain a result R of multiply addition will be described.

The signed fixed point addend Z of 32-bit length is represented, where each bit is represented by $z_i$ and sign extension by one bit is performed with $Z_{32}=Z_{31}$, by the following equation:

$$Z = -z_{32} \cdot 2^{64} + \sum_{i=0}^{31} z_i \cdot 2^{(32+i)} \quad (16)$$

Accordingly, the result R of multiply addition is represented, from equations (14), (15) and (16), by the following equation:

$$R = X \times Y + Z = \sum_{j=0}^{15} \left( -p_{j33} \cdot 2^{33} + \sum_{i=0}^{32} p_{ji} \cdot 2^i + c_j \right) 2^{2j} + \quad (17)$$

$$\left( -z_{32} \cdot 2^{64} + \sum_{i=0}^{31} z_i \cdot 2^{(32+i)} \right)$$

$$= \sum_{j=0}^{15} \left( \sum_{i=0}^{32} p_{ji} \cdot 2^i + c_j \right) 2^{2j} + \sum_{i=0}^{31} z_i \cdot 2^{(32+i)} -$$

$$\underbrace{\left( \sum_{j=0}^{15} p_{j33} \cdot 2^{(33+2j)} + z_{32} \cdot 2^{64} \right)}_{\text{negative portion } N}$$

Conversion of the negative portion N in equation (17) into a two's complement is performed in accordance with the following equations so that it may be handled with an adder. Here, if the multiplicand X and the multiplier Y have a negative maximum value of 32-bit length and the addend Z has a positive maximum value, the result R of multiply addition has a maximum 65-bit length. Accordingly, the operation is performed with 65-bit length.

$$N = -(z_{32} \cdot 2^{64} + p_{15\,33} \cdot 2^{63} + p_{14\,33} \cdot 2^{61} + \quad (18)$$

$$\ldots + p_{1\,33} \cdot 2^{35} + p_{0\,33} \cdot 2^{33})$$

$$= -z_{32} \cdot 2^{64} + 1 \cdot 2^{64} + \overline{p_{15\,33}} \cdot 2^{63} + 1 \cdot 2^{62} + \overline{p_{14\,33}} \cdot 2^{61} + \quad (19)$$

$$\ldots + \overline{p_{1\,33}} \cdot 2^{35} + 1 \cdot 2^{34} + \overline{p_{0\,33}} \cdot 2^{33} + 1 \cdot 2^{32} +$$

$$+ 1 \cdot 2^{31} + 1 \cdot 2^{31}$$

$$= -z_{32} \cdot 2^{64} + \sum_{j=0}^{15} \overline{p_{j33}} \cdot 2^{(33+2j)} + \sum_{j=0}^{16} 1 \cdot 2^{(32+2j)} + \quad (20)$$

$$+ 1 \cdot 2^{31} + 1 \cdot 2^{31}$$

Using N thus obtained, the result R of multiply addition is represented by the following equation:

$$R = \underbrace{-z_{32} \cdot 2^{64} + \sum_{i=0}^{31} z_i \cdot 2^{(32+i)}}_{Z} + \quad (21)$$

$$\underbrace{\sum_{j=0}^{15} \left( \overline{p_{j,33}} \cdot 2^{(33+2j)} + \sum_{i=0}^{32} p_{ji} \cdot 2^i \right) 2^{2j}}_{p_{0-15}} +$$

$$\sum_{j=0}^{16} 1 \cdot 2^{(32+2j)} + \sum_{j=0}^{15} c_j \cdot 2^{2j} + \underbrace{1 \cdot 2^{31}}_{c_z} + \underbrace{1 \cdot 2^{31}}_{c_n}$$

From equation (21), it can be seen that, in order to obtain the result R of multiply addition, all terms appearing in equation (21) should be generated using a Booth's decoder and then added by means of a CSA tree.

Subsequently, construction and operation of a conventional multiply-adder unit (fixed point multiply-adder unit) constructed based on the concept described above will be described with reference to FIGS. 11 to 13.

The conventional multiply-adder unit shown in FIG. 11 includes a first selector 111, a second selector 112, a third selector 113, a fourth selector 114, a Booth's decoder 115, an 11-input CSA tree 116, a first pipeline register 117, a second pipeline register 118, a carry propagation adder 119 and a sign extender 120.

In the conventional multiply-adder unit shown in FIG. 11, the hardware amount is reduced by performing generation and addition of partial products divisionally by a plurality of times while basically the idea described above (idea of calculating a result R of multiply addition in accordance with equation (21)) is adopted. An operating unit similar to the multiply-adder unit is disclosed in Japanese Patent Laid-Open Application No. Heisei 4-205624 ("Serial-Parallel Type Multiplier"). However, while, in the serial-parallel type multiplier of the construction disclosed in the document just mentioned, a single value after passing through a carry propagation adder following a CSA is held as an intermediate result of addition of partial products, in the multiply-adder unit of the construction shown in FIG. 11, a set of a half sum and a half carry which are outputs of a CSA is held as an intermediate result of addition of partial products, thereby raising the speed of operation.

Subsequently, operation of the conventional multiply-adder unit shown in FIG. 11 will be described with reference to FIGS. 12 and 13.

The conventional multiply-adder unit shown in FIG. 11 performs generation and addition of partial products divisionally by two times at a "first operation step" and a "second operation step" in order to reduce the hardware amount.

First, operation at the first operation step will be described.

At the first operation step, a multiplicand X and the lower 16 bits of a multiplier Y are multiplied to produce an operation result (intermediate operation result) of the operation front half (first operation step).

The first selector 111 refers to an operation step switch bit (information of 1-bit length representative of whether operation at the first operation step should be performed or operation at the second operation step should be performed; in this instance, the bit represents that operation at the first operation step should be performed) and selectively outputs the lower 16 bits of the multiplier Y.

The second selector 112 refers to the operation step switch bit which represents that operation at the first operation step should be performed, and selectively outputs a second constant. The second constant here denotes a value which represents $1 \cdot 2^{32}$ ($1 \cdot 2^{(32+2j)}$ when j=0) and $c_n$ ($1 \cdot 2^{31}$) in equation (21) (refer to FIG. 12).

Further, the third selector 113 refers to the calculation step switch bit which represents that operation at the first calculation step should be performed, and selectively outputs a constant (constant of the value 0) which represents that all bits should be 0.

In addition, the fourth selector 114 refers to the calculation step switch bit which represents that operation at the first calculation step should be performed, and selectively outputs a first constant. The first constant here denotes a value which represents $c_z$ ($1 \cdot 2^{31}$), $c_{15} \cdot 2^{30}$ ($c_j \cdot 2^{2j}$ when j=15) and $C_7 \cdot 2^{14}$ ($c_j \cdot 2^{2j}$ when j=7) in equation (21) (refer to FIG. 12).

The Booth's decoder 115 receives the multiplicand X and the output of the first selector 111 as inputs thereto, successively cuts out the output of the first selector 111 in units of 3 bits successively shifting the cut-out start position by 2 bits toward the lower bits beginning with the uppermost bit, and supplies the thus cut out values to an eighth partial product generator h, a seventh partial product generator g, a sixth partial product generator f, a fifth partial product generator e, a fourth partial product generator d, a third partial product generator c, a second partial product generator b, and a first partial product generator a so that eighth to first partial products (eight partial products $P_7$ to $P_0$ when the multiplicand X and the lower 16 bits of the multiplier Y are multiplied) are generated from the cut out values and the value of the multiplicand X by the eighth to first partial product generators, respectively.

Each of the partial products is a value obtained by multiplying the multiplicand X by -2, -1, 0, 1 or 2 as seen from FIG. 9 and is generated in such a manner as illustrated in FIG. 10. It is to be noted that a bit representative of $1 \cdot 2^{(32+2j)}$ (j=1 to 8) in equation (21) is added to the partial products $P_0$ to $P_7$, and another bit representative of $c_j \cdot 2^{2j}$ (j=0 to 6) in equation (21) is added to the partial products $P_1$ to $P_7$ (refer to FIG. 12. Information represented by a bit added to a partial product in this manner will be hereinafter referred to as "additional bit information"). Here, the value of $c_j$ is determined based on the value of $Y_j$ as seen from FIG. 12.

The 11-input CSA tree 116 receives the eight partial products (partial products produced by the first to eighth partial product generators in the Booth's decoder 115 and including additional bit information), the output of the second selector 112, the output of the third selector 113 and the output of the fourth selector 114 as first to eleventh inputs thereto, adds them and outputs a result of the addition as a set of a half sum and a half carry.

The half sum and the half carry are stored as a result of calculation at the first operation step into the first pipeline register 117 and the second pipeline register 118, respectively.

A list of input bits and output bits of the half sum and the half carry of the 11-input CSA tree 116 at the first operation step is shown in FIG. 12.

Subsequently, operation at the second operation step will be described.

At the second operation step, the multiplicand X and the upper 17 bits of the multiplier Y are multiplied, and a result of the multiplication, the result of the multiplication at the first operation step and the addend Z are added to generate a final result R of multiply addition.

The sign extender 120 performs sign extension by one bit for the addend Z. As a result, the addend Z now has 33-bit length.

The first selector 111 refers to the operation step switch bit which represents that operation at the second operation step should be performed (the information of the operation step switch bit is switched upon transition from the first operation step to the second operation step) and selectively outputs the upper 17 bits of the multiplier Y.

Meanwhile, the second selector 112 refers to the operation step switch bit which represents that operation at the second operation step should be performed and selectively outputs the upper 35 bits of a value held in the second pipeline register 118 (half carry of the result of operation at the first operation step).

Further, the third selector 113 refers to the operation step switch bit which represents that operation at the second operation step should be performed and selectively outputs the output of the sign extender 120 (addend Z after sign extension).

In addition, the fourth selector 114 refers to the operation step switch bit which represents that operation at the second operation step should be performed and selectively outputs the upper 34 bits of a value held in the first pipeline register 117 (half sum of the result of operation at the first operation step).

The Booth's decoder 115 receives the multiplicand X and the output of the first selector 111 as inputs thereto, successively cuts out the output of the first selector 111 in units of 3 bits successively shifting the cut-out start position by 2 bits toward the lower bits beginning with the uppermost bit, and supplies the thus cut out values to the eighth partial product generator h, the seventh partial product generator g, the sixth partial product generator f, the fifth partial product generator e, the fourth partial product generator d, the third partial product generator c, the second partial product generator b, and the first partial product generator a so that eighth to first partial products (eight partial products $P_{15}$ to $P_8$ when the multiplicand X and the upper 17 bits of the multiplier Y are multiplied) are generated from the cut out values and the value of the multiplicand X by the eighth to first partial product generators, respectively.

Each of the partial products is a value obtained by multiplying the multiplicand X by $-2, -1, 0, 1$ or 2 as seen from FIG. 9 and is generated in such a manner as illustrated in FIG. 12. It is to be noted that a bit representative of $1 \cdot 2^{(32+2j)}$ (j=9 to 15) in equation (21) is added to the partial products $P_8$ to $P_{14}$, and another bit representative of $c_j \cdot 2^{2j}$ (j=8 to 14) in equation (21) is added to the partial products $P_9$ to $P_{15}$ (refer to FIG. 13).

The 11-input CSA tree 116 receives the eight partial products (partial products generated by the first to eighth partial product generators in the Booth's decoder 115 and including additional bit information), the output of the second selector 112, the output of the third selector 113 and the output of the fourth selector 114 as first to eleventh inputs thereto, adds them and outputs a result of the addition as a set of a half sum and a half carry.

The carry propagation adder 119 adds the value of ① and the value of ② given below to obtain a single result R (result R of the multiply addition) and outputs the result R (carry propagation addition is performed for the value of ① and the value of ② given below). ① A value obtained by concatenation of the half sum of 49-bit length (half sum obtained at the second operation step) and the lower 16 bits of the half sum obtained at the first operation step (lower 16 bits of a value held in the first pipeline register 117) (refer to FIGS. 12 and 13). ② A value obtained by concatenation of the half carry of 48-bit length (half carry obtained at the second operation step) and the lower 15 bits of the half carry obtained at the first operation step (lower 15 bits of a value held in the second pipeline register 118) (refer to FIGS. 12 and 13).

A list of input bits and output bits of the half sum and the half carry of the 11-input CSA tree 116 at the second operation step is shown in FIG. 13.

The terms in equation (21) are included in the input bits in FIG. 12 or 13 without fail. Accordingly, values of the terms in equation (21) are inputted and added by the 11-input CSA tree 116 at either one of the first operation step and the second operation step.

With the conventional multiply-adder unit shown in FIG. 1, however, since the entire addend Z after sign extension is added at the second operation step, eleven values must be inputted to and added by the CSA tree at the second operation step (refer to FIG. 13), and accordingly, a GSA tree having 11 inputs must be prepared. Consequently, the conventional multiply-adder unit is disadvantageous in that an increase of the number of inputs to the CSA tree complicates the construction of the CSA tree and gives rise to an increase of the amount of hardware for realizing the CSA tree and a delay of the operation which uses the CSA tree (to a decrease in operation speed of the entire multiply-adder unit which is caused by an increase in number of stages of adders).

SUMMARY OF THE INVENTION

It is an object of the present invention to provide a multiply-adder unit which allows the number of inputs to an adder tree to be reduced to reduce the amount of hardware and can operate at a high speed.

It is another object of the present invention to provide a multiply-adder unit which allows the number of inputs to a CSA tree to be reduced to reduce the amount of hardware and can operate at a high speed.

In order to attain the objects described above, according to an aspect of the present invention, there is provided a multiply-adder unit having a signed multiplication function, an unsigned multiplication function and a signed fixed point multiply addition function for binary numbers of n-bit length, n being an integer equal to or greater than 1, comprising a bit width extender for performing, upon unsigned operation, zero extension of one bit but performing, upon signed operation, sign extension of one bit for a multiplicand of n-bit length, a zero extender for performing zero extension of 2 bits for a multiplier of n-bit length, a sign extender for performing sign extension of one bit for an addend of n-bit length, a Booth's decoder for cutting out an output of the zero extender in units of 3 bits successively shifting its cut-out start position by 2 bits toward the lower bits beginning with the uppermost bit and supplying the cut out values and an output of the bit width extender to first to (k−1)th partial product generators and a kth partial product generator so that first to (k−1)th partial products and a kth partial product are generated by the first to (k−1)th and kth partial product generators, respectively, k being an integer equal to or greater than 2, a selector for selecting, upon unsigned operation, the kth partial product generated by the Booth's decoder but selecting, upon signed operation, the output of the sign extender, and a k-input adder tree for adding the first to (k−1)th products generated by the Booth's decoder and an output of the selector.

In the multiply-adder unit, the bit width extender performs, upon unsigned operation, zero extension of one bit but performs, upon signed operation, sign extension of one bit for a multiplicand of n-bit length, and the zero extender performs zero extension of 2 bits for a multiplier of n-bit length. Further, the sign extender performs sign extension of one bit for an addend of n-bit length. The Booth's decoder cuts out an output of the zero extender in units of 3 bits successively shifting its cut-out start position by 2 bits toward the lower bits beginning with the uppermost bit and supplies the cut out values and an output of the bit width extender to the first to (k−1)th partial product generators and the kth partial product generator so that first to (k−1)th partial products and a kth partial product are generated by the first to (k−1)th and kth partial product generators, respectively. Then, the selector selects, upon unsigned operation, the kth partial product generated by the Booth's decoder but selects, upon signed operation, the output of the sign extender, and the k-input adder tree adds the first to (k−1)th products generated by the Booth's decoder and an output of the selector.

With the multiply-adder unit, since zero extension of 2 bits for a multiplier is performed by the zero extender and partial products are generated not using the idea of equation (6) but using the idea of equation (3), the number of inputs to the adder tree can be reduced comparing with those of conventional multiply-adder units. Consequently, the adder tree is simplified in structure and reduced in delay of operation. Accordingly, the present invention provides a multiply-adder unit which includes a reduced amount of hardware comparing with that of the conventional multiply-adder unit described hereinabove with reference to FIG. 3 and which operates at a higher speed than the conventional multiply-adder unit.

For example, for n=16, while the conventional multiply-adder unit requires a 10-input adder tree, the multiply-adder unit of the present invention can be constructed using a 9-input adder tree. As a result, in order to construct an adder tree based on the Wallace's method, while the conventional multiply-adder unit requires CSAs of five stages and one carry propagation adder, the multiply-adder unit of the present invention can be constructed using CSAs of four stages and one carry propagation adder (refer to FIG. 4). In other words, the number of stages of CSAs can be reduced by one. Consequently, while reducing the hardware amount comparing with the conventional multiply-adder unit, the operation time can be reduced comparing with the conventional multiply-adder unit (when n≠16, for example, when n=32, a decrease of the number of inputs of an adder tree may not necessarily result in reduction in number of stages of CSAs, the reduction of the number of inputs of an adder tree can be a factor of the advantages described above irrespective of a reduction of the number of stages of CSAs.

According to another aspect of the present invention, there is provided a multiply-adder unit which receives a signed multiplicand X of 32-bit length, a signed multiplier Y of 32-bit length and a signed addend Z of 32-bit length as inputs thereto and outputs a multiply addition X×Y+Z as a result R, comprising, a sign extender for performing sign extension of one bit for the addend Z, a bit divider for dividing an output of the sign extender into lower 18 bits and upper 15 bits, a first selector for selectively outputting the lower 16 bits of the multiplier Y at a first operation step and for selectively outputting the upper 17 bits of the multiplier Y at a second operation step, a second selector for selectively outputting a second constant at the first operation step and for selectively outputting the upper 35 bits of a first value at the second operation step, a third selector for selectively outputting a value obtained by concatenation of the lower 18 bits of an output of the bit divider and a first constant at the first operation step and for selectively outputting another value obtained by concatenation of the upper 15 bits of the output of the bit divider and the upper 34 bits of a second value at the second operation step, a Booth's decoder for cutting out an output of the first selector in units of 3 bits successively shifting its cut-out start position by 2 bits toward the lower bits beginning with the uppermost bit and supplying the cut out values to an eighth partial product generator, a seventh partial product generator, a sixth partial product generator, a fifth partial product generator, a fourth partial product generator, a third partial product generator, a second partial product generator, and a first partial product generator so that eighth, seventh, sixth, fifth, fourth, third, second and first partial products are generated from the cut out values and the value of the multiplicand X by the eighth to first partial product generators, respectively, a 10-input carry save adder tree for adding the first to eighth partial products generated by the Booth's decoder, outputs of the second and third selectors and an additional bit information set, a first pipeline register for storing a half sum of an output of the 10-input carry save adder tree at the first operation step and supplying the stored value as the second value to the third selector, a second pipeline register for storing a half carry of the output of the 10-input carry save adder tree at the first operation step and supplying the stored value as the first value to the second selector, and a carry propagation adder for performing carry propagation addition for a value obtained by concatenation of the half sum outputted from the 10-input carry save adder tree at the second operation step and the lower 16 bits of the half sum stored in the first pipeline register at the first operation step and another value obtained by concatenation of the half carry outputted from the 10-input carry save adder tree at the second operation step and the lower 15 bits of the half carry stored in the second pipeline register at the first operation step.

In the multiply-adder unit which receives a signed multiplicand X of 32-bit length, a signed multiplier Y of 32-bit length and a signed addend Z of 32-bit length as inputs thereto and outputs a multiply addition X×Y+Z as a result R, the sign extender performs sign extension of one bit for the addend Z, and the bit divider divides the output of the sign extender into lower 18 bits and upper 15 bits. The first selector selectively outputs the lower 16 bits of the multiplier Y at the first operation step and selectively outputs the upper 17 bits of the multiplier Y at the second operation step. The second selector selectively outputs the second constant at the first operation step and selectively outputs the upper 35 bits of the first value held in the second pipe line register at the second operation step. The third selector selectively outputs the value obtained by concatenation of the lower 18 bits of the output of the bit divider and the first constant at the first operation step and selectively outputs the value obtained by concatenation of the upper 15 bits of the output of the bit divider and the upper 34 bits of the second value held in the first pipeline register at the second operation step. The Booth's decoder cuts out the output of the first selector in units of 3 bits successively shifting its cut-out start position by 2 bits toward the lower bits beginning with the uppermost bit and supplies the cut out values to the eighth partial product generator, the seventh partial product generator, the sixth partial product generator, the fifth partial product generator, the fourth partial product generator, the third partial product generator, the second partial product generator, and the first partial product generator so that eighth, seventh, sixth, fifth, fourth, third, second and first partial products are generated from the cut out values and the value of the multiplicand X by the eighth to first partial product generators, respectively. The 10-input carry save adder tree adds the first to eighth partial products generated by the Booth's decoder, the outputs of the second and third selectors and an additional bit information set. The first pipeline register stores the half sum of the output of the 10-input carry save adder tree at the first operation step and supplies the stored value as the second value to the third selector while the second pipeline register stores the half carry of the output of the 10-input carry save adder tree at the first operation step and supplies the stored value as the first value to the second selector. The carry propagation adder performs carry propagation addition for the value obtained by concatenation of the half sum outputted from the 10-input carry save adder tree at the second operation step and the lower 16 bits of the half sum stored in the first pipeline register at the first operation step and the value obtained by concatenation of the half carry outputted from the 10-input carry save adder tree at the second operation step and the lower 15 bits of the half carry stored in the second pipeline register at the first operation step.

With the multiply-adder unit, since the value obtained by sign extension of the addend Z is divided so that values obtained by the division may not overlap in bit weight with the other input values and the values are concatenated with the other input values and then the value produced by the division and the concatenation is supplied divisionally by twice at the first operation step and the second operation step to the carry save adder tree, while the conventional multiply-adder unit described hereinabove with reference to FIG. 11 requires eleven (11) inputs to a carry save adder tree, the number of such inputs can be reduced to ten (10). Consequently, the carry save adder tree can be produced with a reduced amount of hardware comparing with the conventional multiply-adder unit (fixed point multiply-adder unit) and can operate at a higher speed than the conventional multiply-adder unit with a delay amount in operation reduced.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a table illustrating a relationship between the number of inputs to an adder tree and the number of stages of CSAs in the adder tree where the adder tree is constructed based on the Wallace's method;

FIGS. 9 and 10 are tables illustrating operation of a Booth's decoder employed in the multiply-adder unit of FIG. 5;

DESCRIPTION OF THE PREFERRED EMBODIMENTS

Figure 1:
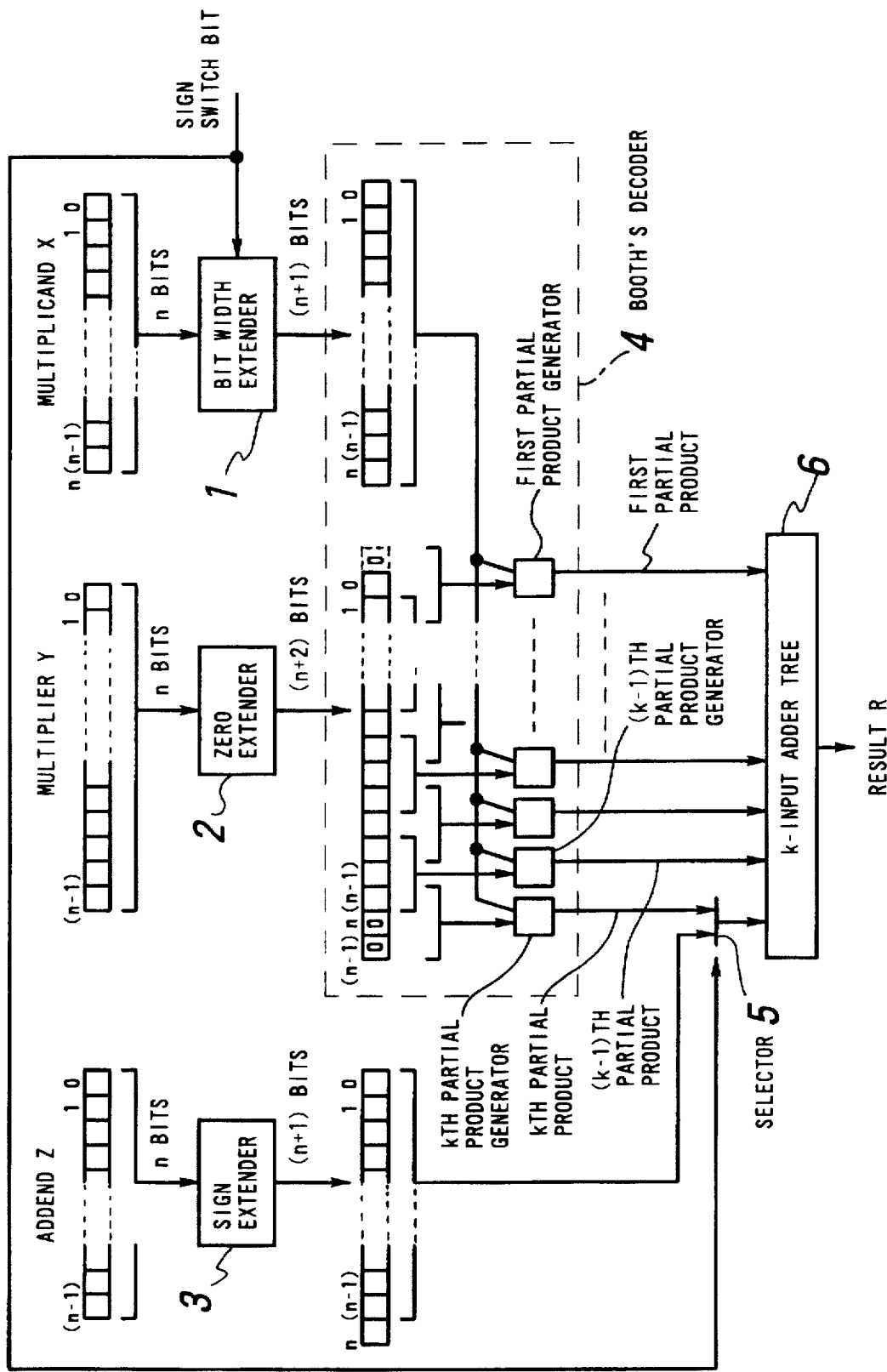
FIG. 1 is a block diagram of a multiply-adder unit showing a preferred embodiment of the present invention.

Referring first to FIG. 1, there is shown in block diagram a multiply-adder unit to which the present invention is applied. The multiply-adder unit shown includes a bit width extender 1 for receiving a multiplicand X of n-bit length as an input thereto, a zero extender 2 for receiving a multiplier Y of n-bit length as an input thereto, a sign extender 3 for receiving an addend Z of n-bit length as an input thereto, a Booth's decoder 4, a selector 5, and a k-input adder tree 6 for outputting a result R. It is to be noted that, as described hereinabove, n is a positive even number such as, for example, 16 or 32 (also 64 is used popularly). The Booth's decoder 4 includes first to kth partial product generators.

Figure 2:
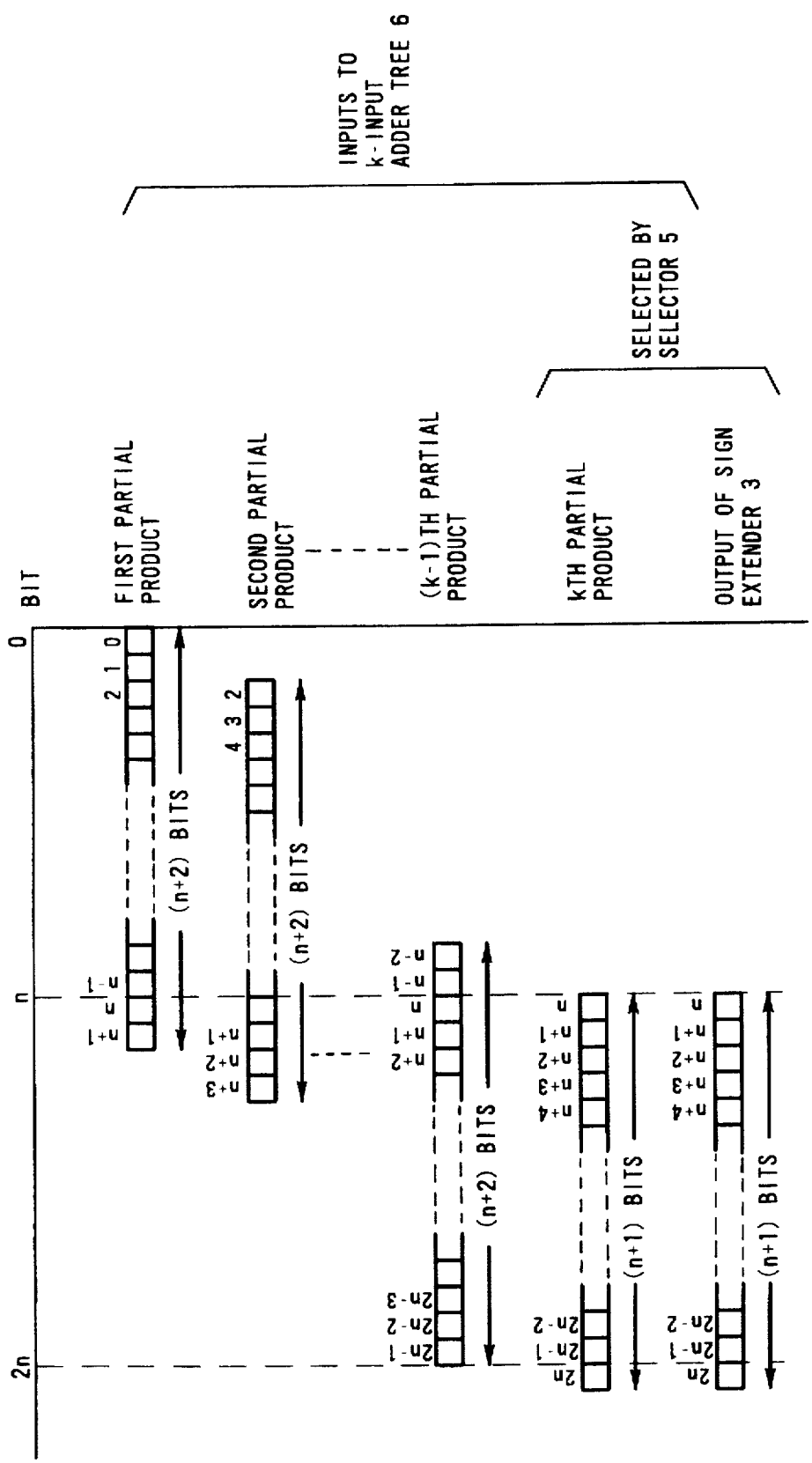
FIG. 2 is a diagrammatic view showing bit start positions and bit lengths of first to kth partial products inputted to a k-input adder tree and an output of a sign extender of the multiply-adder unit of FIG. 1.

FIG. 2 illustrates bit start positions and bit lengths of first to kth partial products inputted to the k-input adder tree 6 of the multiply-adder unit of FIG. 1 and the output of the sign extender 3.

Operation of the multiply-adder unit having the construction described above will be described below.

First, operation when unsigned multiplication is performed will be described.

When unsigned multiplication is performed, the multiply-adder unit of FIG. 1 receives an unsigned multiplicand X of n-bit length and an unsigned multiplier Y of n-bit length as inputs thereto and outputs a result R (result of multiplication of X and Y).

The bit width extender 1 receives the multiplicand X as an input thereto, refers to a sign switch bit of the multiplicand X (information of 1-bit length which represents whether signed operation should be performed or unsigned operation should be performed; in this instance, the bit represents that unsigned operation should be performed) to perform zero extension of one bit for the multiplicand X and sends a result of the zero extension to the Booth's decoder 4.

The zero extender 2 receives the multiplier Y as an input thereto, performs zero extension of 2 bits for the multiplier Y and sends a result of the zero extension to the Booth's decoder 4.

The Booth's decoder 4 cuts out bit trains of 3-bit length from the output of the zero extender 2 successively shifting the cut-out start position by 2 bits toward the lower bits beginning with the uppermost bit. This cutting out of bit trains is performed in order to cut out three bits ($y'_{(2i+1)}$, $y'_{2i}$ and $y'_{(2i-1)}$) required to determine $Y_i'$ based on equation (3) when m=n+2 in equation (1) and supply the three bits to the ith partial product generator (while i is an integer satisfying $0 \leq i < m$ as described hereinabove, here $0 \leq i < k$).

Here, since n is an even number, also m is an even number. Further, the number k of partial products generated by the Booth's decoder 4 is equal to the value of j when m=n+2 in equation (1). In particular, k has a value defined by the following equation (22):

$$k = [(n+2)/2+0.5] \quad (22)$$

The first to kth partial product generators in the Booth's decoder 4 refer to the bit trains of the 3-bit length cut out from the output of the zero extender 2 and the output of the bit width extender 1 to generate partial products $P_i'$ (i=0 to (k−1)) represented by equation (9) when m=n+2 in equation (1). The partial products have values of the output of the bit width extender 1 multiplied by −2, −1, 0, 1 or 2 as seen from equation (3).

It is to be noted that the Booth's decoder 4 performs its processing, even when unsigned operation is performed, treating the output of the bit width extender 1 and the output of the zero extender 2 as signed numbers.

The selector 5 refers to the sign switch bit which represents that unsigned operation should be performed and selectively outputs, from between the kth partial product (output of the kth partial product generator) and the output of the sign extender 3, the kth partial product.

The k-input adder tree 6 adds the first to (k−1)th partial products (outputs of the first to (k−1)th partial product generators) and the output of the selector 5 (output of the kth partial product generator) and outputs a value obtained by unsigned multiplication of the multiplicand X and the multiplier Y as a result R.

Subsequently, operation when signed fixed point multiply addition is performed will be described.

The multiply-adder unit of FIG. 1 receives, when signed fixed point multiply addition is to be performed, a signed multiplicand X of n-bit length and a signed multiplier Y of n-bit length as inputs thereto, performs signed multiplication of X and Y to obtain an intermediate result of 2n-bit length, adds a signed addend Z of n-bit length to the upper n bits of the intermediate result to obtain a result R of (2n+1)-bit length, and outputs the result R. It i s to be noted that the term "intermediate e result" is used for the convenience of description and a value corresponding to the "intermediate result" is not actually generated during the operation.

The bit width extender 1 receives the multiplicand X as an input thereto, refers to the code switch bit of the multiplicand X which represents that signed operation should be performed to perform sign extension of 1 bit for the multiplicand X and sends a result of the sign extension to the Booth's decoder 4.

The zero extender 2 receives the multiplier Y as an input thereto, performs zero extension of 2 bits for the multiplier Y and sends a result of the zero extension to the Booth's decoder 4. The zero extension is performed for matching with processing for performance of unsigned multiplication (as hereinafter described, the uppermost 2 bits resulting from zero extension are not used in the multiply addition). In this manner, the zero extender 2 performs the same processing whether unsigned multiplication is performed or signed fixed point multiply addition is performed.

The Booth's decoder 4 cuts off the uppermost 2 bits of and cuts out from the output of the zero extender 2 (output of (n+2)-bit length) bit trains of 3-bit length successively shifting the cut-out start position by 2 bits toward the lower bits beginning with the (n−1)th bit. This cutting out of a bit train is performed in order to cut out three bits ($y'_{(2i+1)}$, $y'_{2i}$ and $y'_{(2i-1)}$) necessary to determine Yi' based on equation (3) when m=n in equation (1) and supply the three bits to the ith partial product generator (while i is an integer satisfying $0 \leq i < m$ as described hereinabove, here 0<i<(k−1)). In particular, when signed fixed point multiply addition is performed, the number of partial products generated by the Booth's decoder 4 is k−1, and this value k−1 is equal to the value of j when m=m in equation (1).

The first to (k−1)th partial product generators in the Booth's decoder 4 refer to the bit trains of 3-bit length cut out from the output of the zero extender 2 and the output of the bit width extender 1 to generate partial products $P_i'$ (i=0 to (k−2)) represented by equation (9) when m=n+2 in equation (1).

It is to be noted that it is possible to produce a kth partial product by means of the kth product generator without cutting off the uppermost 2 bits of the output of the zero extender 2 in order to establish matching with processing in performance of unsigned multiplication. Also in thin instance, however, the kth partial product is not used in the multiply addition at all as hereinafter described.

Meanwhile, the sign extender 3 performs sign extension of 1 bit for the addend Z.

The selector 5 refers to the sign switch bit which represents that signed operation should be performed and selectively outputs, from between the kth partial product and the output of the sign extender 3 (addend Z after the sign extension by the sign extender 3), the output of the sign extender 3.

The k-input adder tree 6 adds the first to (k−1)th partial products (outputs of the first to (k−1)th partial product generators) and the output of the selector 5 (addend Z after the sign extension by the sign extender 3) and outputs a value obtained by signed multiplication of the multiplicand X and the multiplier Y and addition of the addend Z to the sum of the multiplicand X and the multiplier Y as a result R.

It is to be noted that, when signed multiplication is to be performed (when multiplication of the signed multiplicand X of n-bit length and the signed multiplier Y of n-bit length is to be performed), the operation when the signed fixed point multiply addition described above is performed is performed after 0 is inputted as the addend Z (after the addend Z is set to Z=0) to realize the signed multiplication (by the operation, a result R which is a signed multiplication result between the multiplicand X and the multiplier Y is obtained).

Subsequently, advantages of the multiply-adder unit described above with reference to FIG. 1 will be described with reference to FIG. 2. FIG. 2 illustrates bit start positions and bit lengths of partial products (first to (k−1)th partial products and kth partial product) inputted to the k-input adder tree 6 and the output of the sign extender 3 (addend Z after the sign extension by the sign extender 3).

As seen from FIG. 2, in the multiply-adder unit of FIG. 1, in order to obtain a result R, when unsigned multiplication is performed, totaling k values of the first to kth partial products should be added. On the other hand, when signed fixed point multiply addition is performed (including when signed multiplication is performed), totaling k values of the first to (k−1)th partial products and the output of the sign extender 3 should be added. Accordingly, it is recognized that k inputs are sufficient as inputs to an adder tree (that is, an adder tree may be formed from the k-input adder tree 6).

This will be described below in comparison with the conventional multiply-adder unit described hereinabove with reference to FIG. 3.

Figure 3:
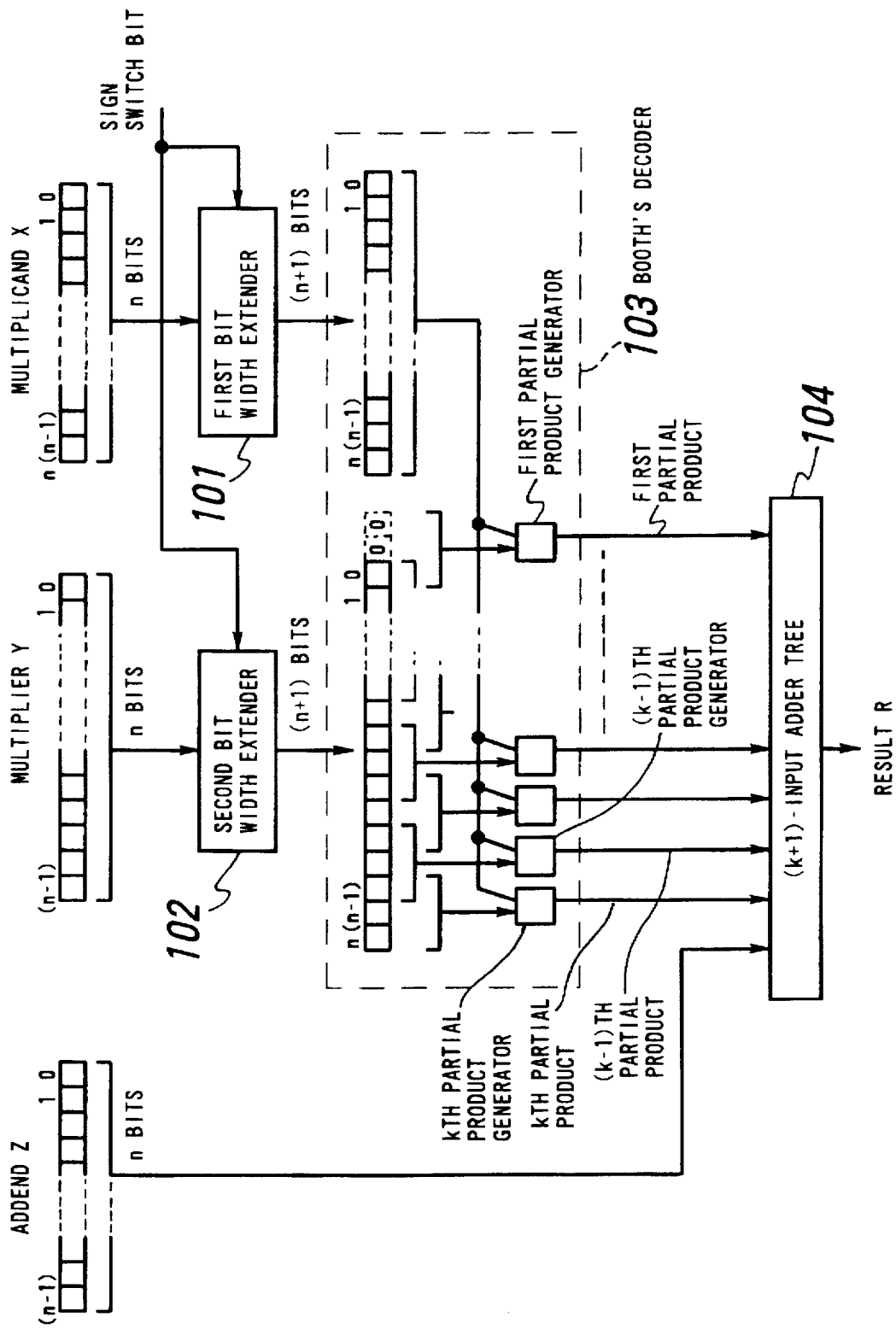
FIG. 3 is a block diagram showing a conventional multiply-adder unit.

The conventional multiply-adder unit shown in FIG. 3 performs, upon unsigned operation, zero extension of 1 bit for an unsigned multiplier Y to convert the multiplier Y into a signed multiplier and generates partial products using the signed multiplier. In contrast, the multiply-adder unit of FIG. 1 according to the present invention performs zero extension of 2 bits for an unsigned multiplier Y to convert the multiplier Y into a signed multiplier and generates partial products using the signed multiplier. As a result of such "zero extension of 2 bits", in order to obtain partial products, not the equation (6) but the equation (3) is used, and consequently, upon signed operation, there is no necessity of using the uppermost two bits of the output of the zero extender 2. In other words, upon signed operation, the kth partial product is not required. With the multiply-adder unit of FIG. 1, since the kth partial product is not required upon signed operation, the number of partial products where a signed multiplier is handled can be reduced by one. Consequently, simplification and increase in speed of operation (reduction in delay of operation) of an adder tree can be achieved.

Further, as seen from FIG. 2, the bit start positions and the bit lengths of the kth partial product which is added when unsigned multiplication is performed and the addend Z which is added when signed fixed point multiply addition is performed (addend Z after sign extension of 1 bit is performed by the sign extender 3) are equal to each other, respectively. In particular, both of the kth partial product and the addend Z start from the nth bit and have (n+1)-bit length. Consequently, the kth partial product and the addend Z can be switched readily only by means of the single selector 5 of (n+1)-bit length. In short, according to the idea of the multiply-adder unit of the present invention shown FIG. 1, a multiply-adder unit can be realized with a very small amount of increase in hardware comparing with an existing multiplier.

<Second Embodiment>

Figure 5:
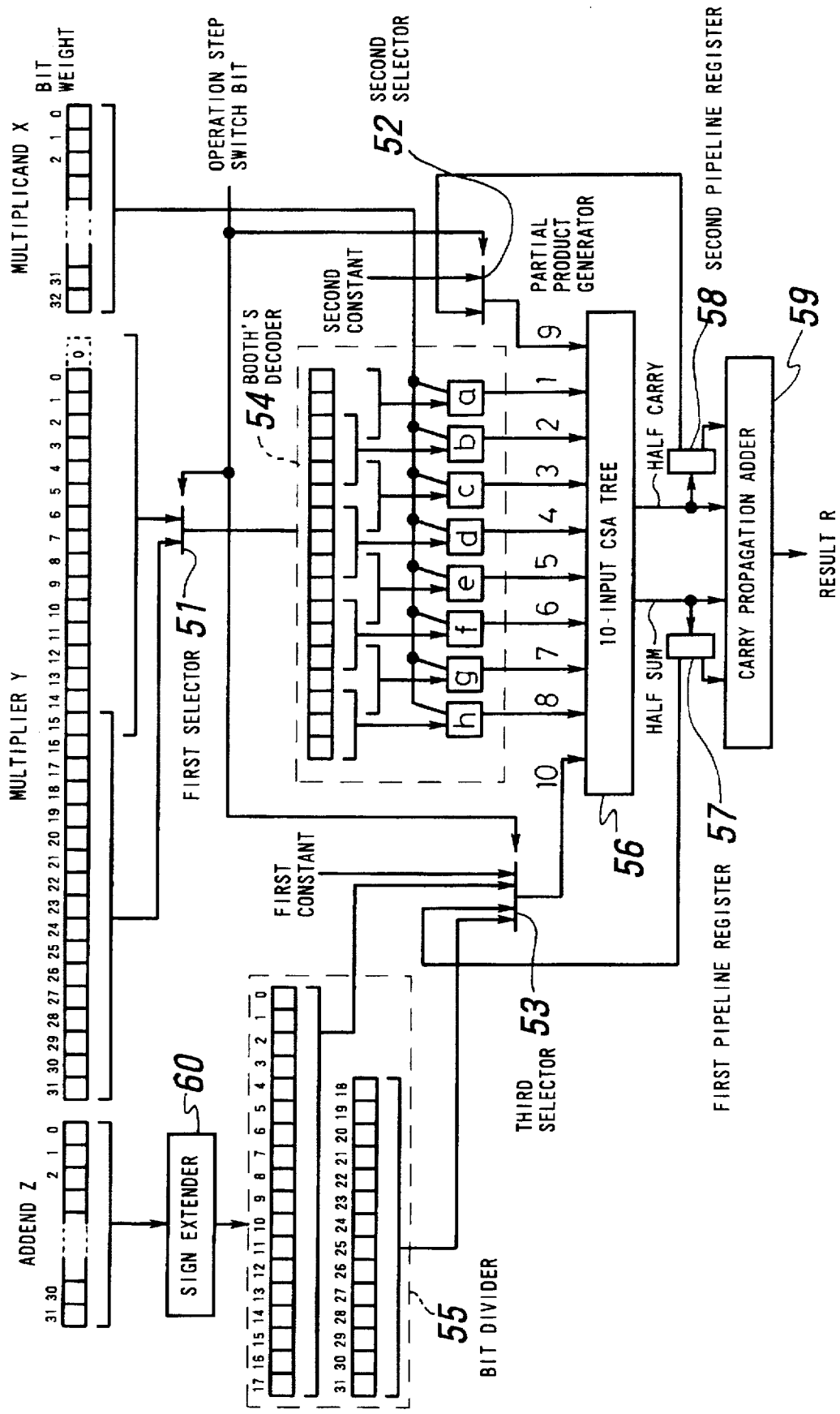
FIG. 5 is a block diagram of another multiply-adder unit showing a second preferred embodiment of the present invention.

Referring now to FIG. 5, there is shown in block diagram another multiply-adder unit to which the present invention is applied. The multiply-adder unit shown receives a signed multiplicand X of 33-bit length, a signed multiplier Y of 32-bit length and an addend Z of 32-bit length as inputs thereto and outputs a multiply addition of the inputs, that is, X×Y+Z, as a result R. The multiply-adder unit includes a first selector 51, a second selector 52, a third selector 53, a Booth's decoder 54, a bit divider 55, a 10-input CSA tree 56, a first pipeline register 57, a second pipeline register 58, a carry propagation adder 59, and a sign extender 60. The Booth's decoder 54 includes first to eighth partial product generators a to h.

Figure 6:
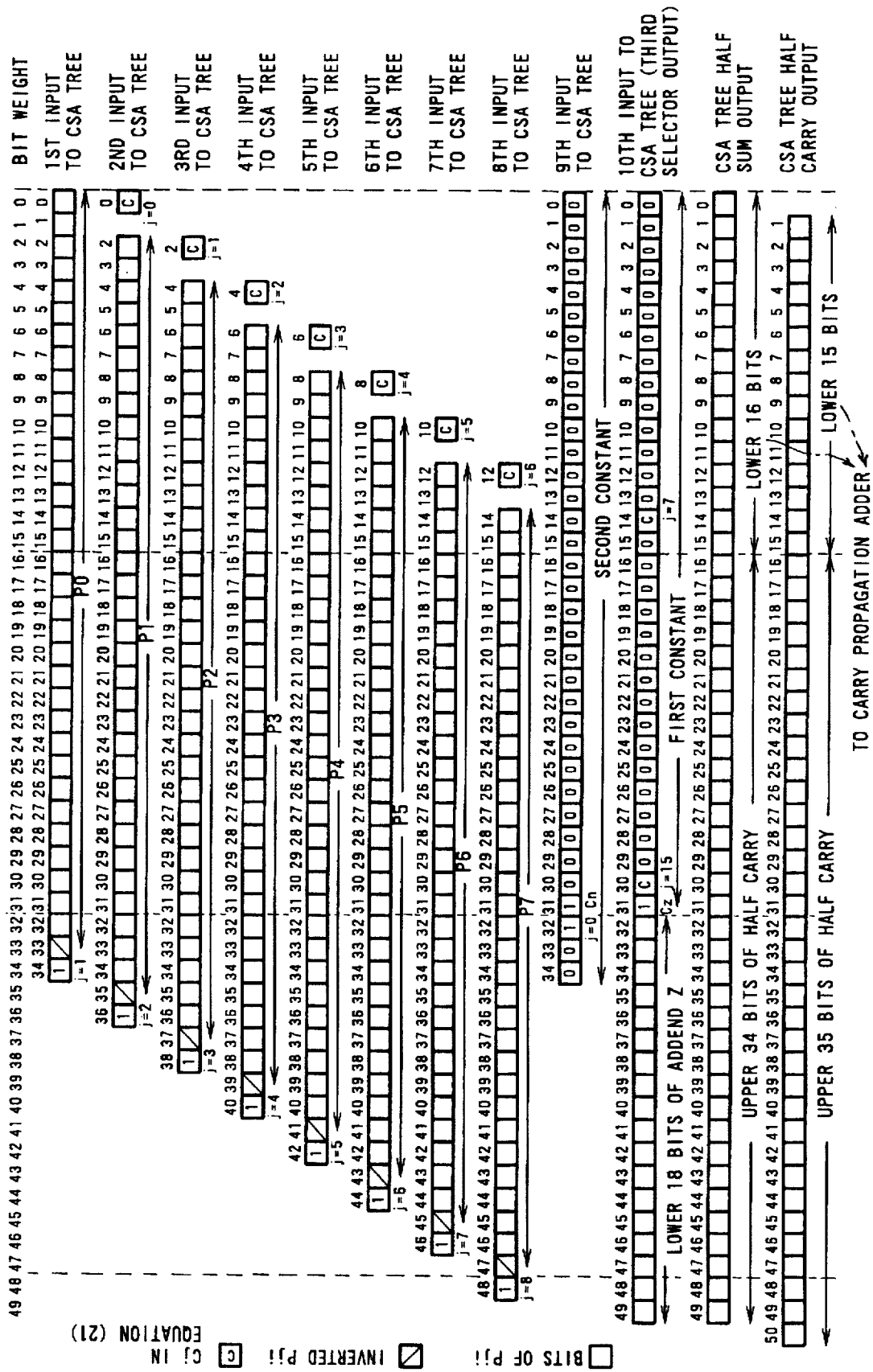
FIG. 6 is a diagrammatic view showing a list of inputs and outputs of a 10-input CSA tree in the multiply-adder unit of FIG. 5 at a first operation step.

FIG. 6 shows a list of input bits of partial products, the addend, and additional bit information and outputs (bits of half sums and half carries) of the 10-input CSA tree 56 at a first operation step of the multiply-adder unit of FIG. 5.

Figure 7:
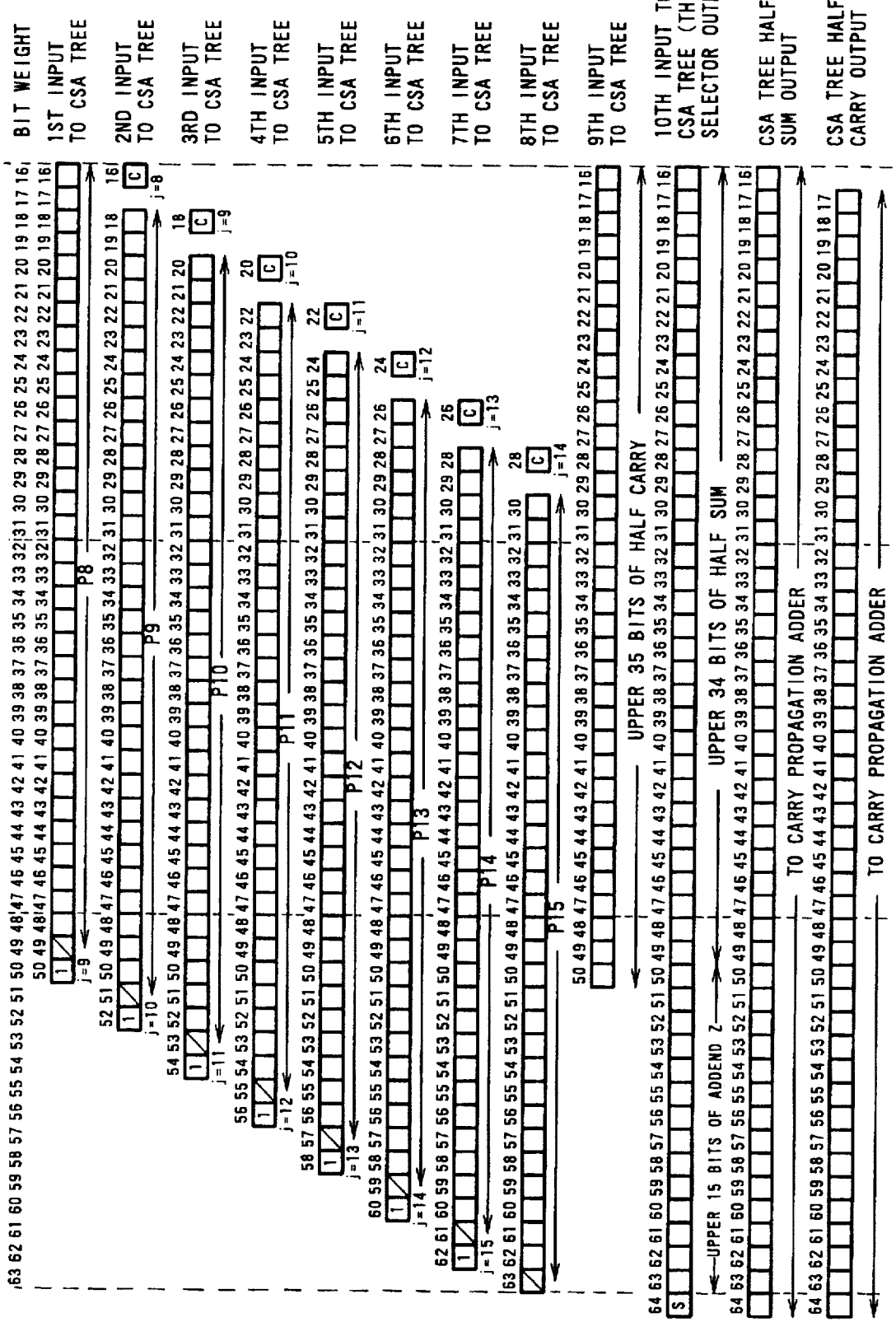
FIG. 7 is a diagrammatic view showing a list of inputs and outputs of the 10-input CSA tree in the multiply-adder unit of FIG. 5 at a second operation step.
Figure 8:
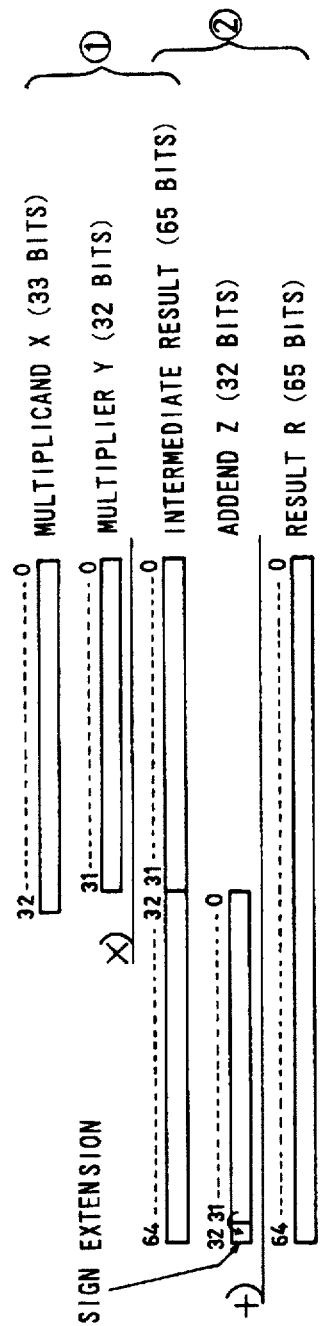
FIG. 8 is a diagrammatic view illustrating a manner of multiply addition performed by the multiply-adder unit of FIG. 5.

FIG. 7 shows a list of input bits and output bits (half sum and a half carry) of the 10-input CSA tree 56 at a second operation step of the multiply-adder unit of FIG. 5.

FIGS. 9 and 10 illustrate operation of the multiply-adder unit of FIG. 5.

Operation of the multiply-adder unit of FIG. 5 having the construction described above will be described with reference to FIGS. 6 and 7 in addition to FIG. 5.

The multiply-adder unit of FIG. 5 performs generation and addition of partial products divisionally by twice at a "first operation step" and a "second operation step" in order to reduce the hardware amount (in this regard, the multiply-adder unit of FIG. 5 is similar to the conventional multiply-adder unit described hereinabove with reference to FIG. 5).

First, operation of the multiply-adder unit when operation is performed at the first operation step will be described.

The multiply-adder unit of FIG. 5 multiplies, at the first operation step, a multiplicand X and the lower 16 bits of a multiplier Y and adds part (the lower 18 bits) of an addend Z to produce an intermediate operation result.

The sign extender 60 performs sign extension of one bit for the addend Z. Consequently, the resulting addend Z has 33-bit length.

The bit divider 55 divides the output of the sign extender 60 (addend Z after sign extended) into the lower 18 bits and the upper 15 bits.

The first selector 51 refers to an operation step switch bit (information of 1-bit length representative of whether operation at the first operation step should be performed or operation at the second operation step should be performed; in this instance, the bit represents that operation at the first operation step should be performed) and selectively outputs the lower 16 bits of the multiplier Y.

Meanwhile, the second selector 52 refers to the operation step switch bit which represents that operation at the first operation step should be performed, and selectively outputs a second constant. The second constant here denotes a value which represents $1 \cdot 2^{32}$ ($1 \cdot 2^{(32+2j)}$ when j=0) and $c_n(1 \cdot 2^{31})$ in equation (21) (refer to FIG. 6).

Further, the third selector 53 refers to the operation step switch bit which represents that operation at the first operation step should be performed, and selectively outputs a value obtained by concatenation of the lower 18 bits of the output of the bit divider 55 ("lower 18 bits of the addend Z after sign extension" outputted from the bit divider 55) and a first constant. The first constant here denotes a value which represents $c_z(1 \cdot 2^{31})$, $c_{15} \cdot 2^{30}$ ($c_j \cdot 2^{2j}$ when j=15) and $C_7 \cdot 2^{14}$ ($C_j \cdot 2^{2j}$ when j=7)) in equation (21) (refer to FIG. 6).

The Booth's decoder 54 receives the multiplicand X and the output of the first selector 51 as inputs thereto, cuts out the output of the first selector 51 in units of 3 bits successively shifting the cut-out start position by 2 bits toward the lower bits beginning with the uppermost bit, and supplies the thus cut out values to the eighth partial product generator h, the seventh partial product generator g, the sixth partial product generator f, the fifth partial product generator e, the fourth partial product generator d, the third partial product generator c, the second partial product generator b, and the first partial product generator a so that eighth to first partial products (eight partial products $P_7$ to $P_0$ when the lower 16 bits of the multiplicand X and the multiplier Y are multiplied) are generated from the cut out values and the value of the multiplicand X by the eighth to first partial product generators, respectively.

Each of the partial products is a value obtained by multiplying the multiplicand X by -2, -1, 0, 1 or 2 as seen from FIG. 9 and is generated in such a manner as illustrated in FIG. 10. It is to be noted that, similarly as in the conventional multiply-adder unit described hereinabove with reference to FIG. 11, a bit representative of $1 \cdot 2^{(32+2j)}$ (j=1 to 8) in equation (21) is added to the partial products $P_0$ to $P_7$, and another bit representative of $c_j \cdot 2^{2j}$ (j=0 to 6) in equation (21) is added to the partial products $P_1$ to $P_7$ (refer to FIG. 6: as described hereinabove, information represented by the bits added to the partial products is referred to as "additional bit information"). Here, the value of $c_j$ is determined based on the value of $Y_j$ in such a manner as seen in FIG. 10.

The 10-input CSA tree 56 receives the eight partial products (partial products produced by the first to eighth partial product generators in the Booth's decoder 54 and including additional bit information), the output of the second selector 52, and the output of the third selector 53 as first to tenth inputs thereto, adds them and outputs a result of the addition as a set of a half sum and a half carry.

The half sum and the half carry are held as a result of the operation at the first operation step into the first pipeline register 57 and the second pipeline register 58, respectively.

Subsequently, operation when operation at the second operation step is performed will be described.

At the second operation step, the multiply-adder unit of FIG. 5 multiplies the multiplicand X and the upper 17 bits of the multiplier Y and adds a result of the operation at the first operation step and part of the addend Z (the upper 15 bits which have not been added at the first operation step) to produce a final result R of the multiply addition.

It is to be noted that, upon transition from the first operation step to the second operation step, the operation step switch bit is switched from the "information which represents that the first operation step should be performed" to "information which represents that the second operation step should be performed".

The first selector 51 refers to the operation step switch bit which represents that operation at the second operation step should be performed and selectively outputs the upper 17 bits of the multiplier Y.

Meanwhile, the second selector 52 refers to the operation step switch bit which represents that operation at the second operation step should be performed, and selectively outputs the upper 35 bits of the value held in the second pipeline register 58 (half carry of the result of the operation at the first operation step).

Further, the third selector 53 refers to the operation step switch bit which represents that operation at the first operation step should be performed, and selectively outputs a value obtained by concatenation of the upper 15 bits of the output of the bit divider 55 ("upper 15 bits of the addend Z after sign extension" outputted from the bit divider 55) and the upper 34 bits of the value held in the first pipeline register 57 (half sum of the result of the operation at the first operation step).

The Booth's decoder 54 receives the multiplicand X and the output of the first selector 51 as inputs thereto, cuts out the output of the first selector 51 in units of 3 bits successively shifting the cut-out start position by 2 bits toward the Lower bits beginning with the uppermost bit, and supplies the thus cut out values to the eighth partial product generator h, the seventh partial product generator g, the sixth partial product generator f, the fifth partial product generator e, the fourth partial product generator d, the third partial product generator c, the second partial product generator b, and the first partial product generator a so that eighth to first partial products (eight partial products $P_{15}$ to $P_8$ when the upper 17 bits of the multiplicand X and the multiplier Y are multiplied) are generated from the cut out values and the value of the multiplicand X by the eighth to first partial product generators h to a, respectively.

Each of the partial products is a value obtained by multiplying the multiplicand X by −2, −1, 0, 1 or 2 as seen from FIG. 9 and is generated in such a manner as illustrated in FIG. 10. It is to be noted that, similarly as in the conventional multiply-adder unit described hereinabove with reference to FIG. 11, a bit representative of $1 \cdot 2^{(32+2j)}$ (j=9 to 15) in equation (21) is added to the partial products $P_8$ to $P_{14}$ and a bit representative of $c_j \cdot 2^{2j}$ (j=8 to 14) in equation (21) is added to the partial products $P_8$ to $P_{15}$ (refer to FIG. 7).

The 10-input CSA tree 56 receives the eight partial products (partial products produced by the first to eighth partial product generators a to h in the Booth's decoder 54 and including additional bit information), the output of the second selector 52, and the output of the third selector 53 as first to tenth inputs thereto, adds them and outputs a result of the addition as a set of a half sum and a half carry.

The carry propagation adder 59 adds the value of ① and the value of ② given below to obtain a single result R (result R of the multiply addition) and outputs the result R (carry propagation addition is performed for the value of ① and the value of ② given below). ① A value obtained by concatenation of the half sum of 49-bit length (half sum obtained at the second operation step) and the lower 16 bits of the half sum obtained at the first operation step (lower 16 bits of the value held in the first pipeline register 57) (refer to FIGS. 6 and 7). ② A value obtained by concatenation of the half carry of 48-bit length (half carry obtained at the second operation step) and the lower 15 bits of the half carry obtained at the first operation step (lower 15 bits of the value held in the second pipeline register 58) (refer to FIGS. 6 and 7).

Figure 11:
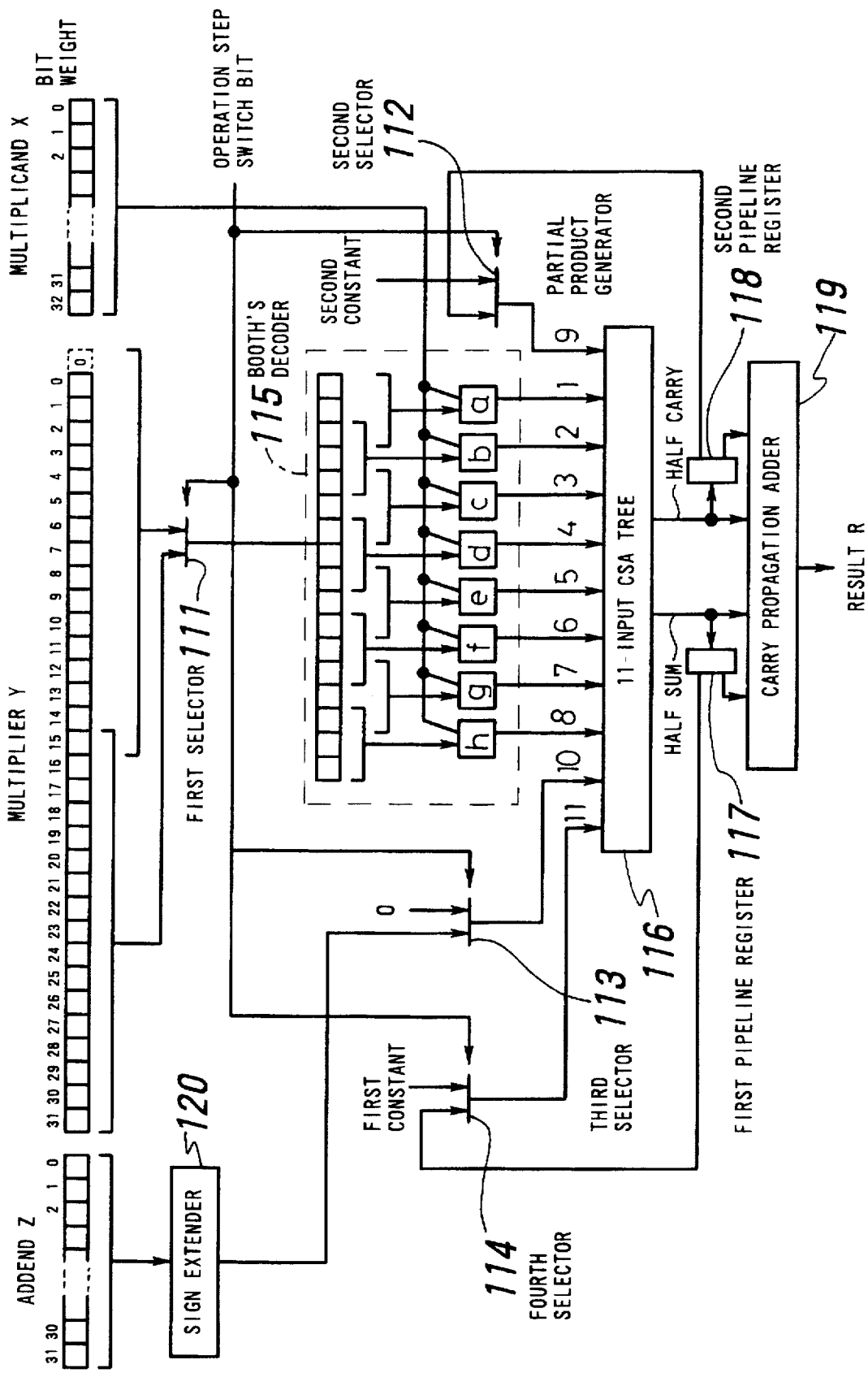
FIG. 11 is a block diagram showing another conventional multiply-adder unit.
Figure 12:
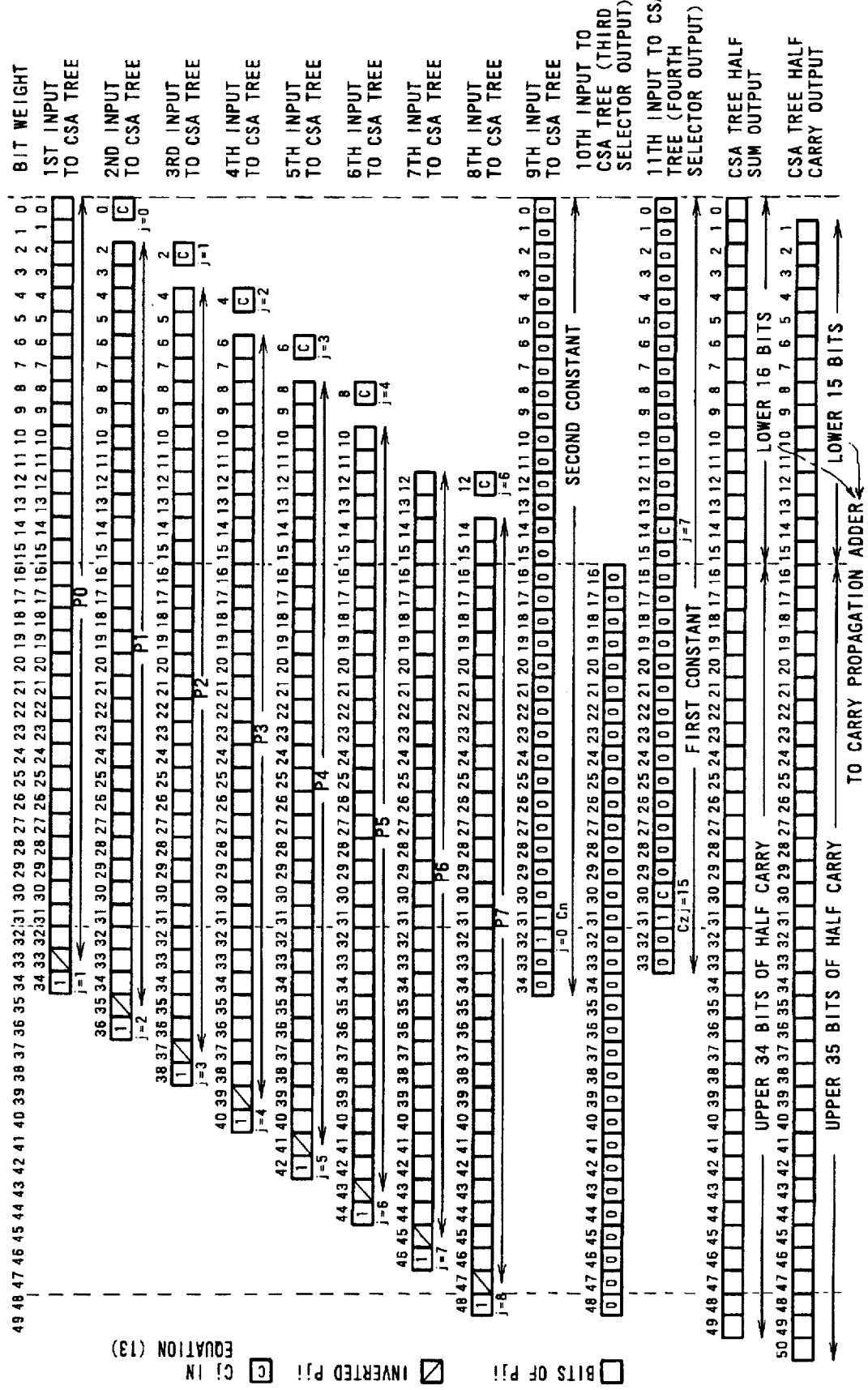
FIG. 12 is a diagrammatic view showing a list of inputs and outputs of an 11-input CSA tree in the conventional multiply-adder unit of FIG. 11 at a first operation step.
Figure 13:
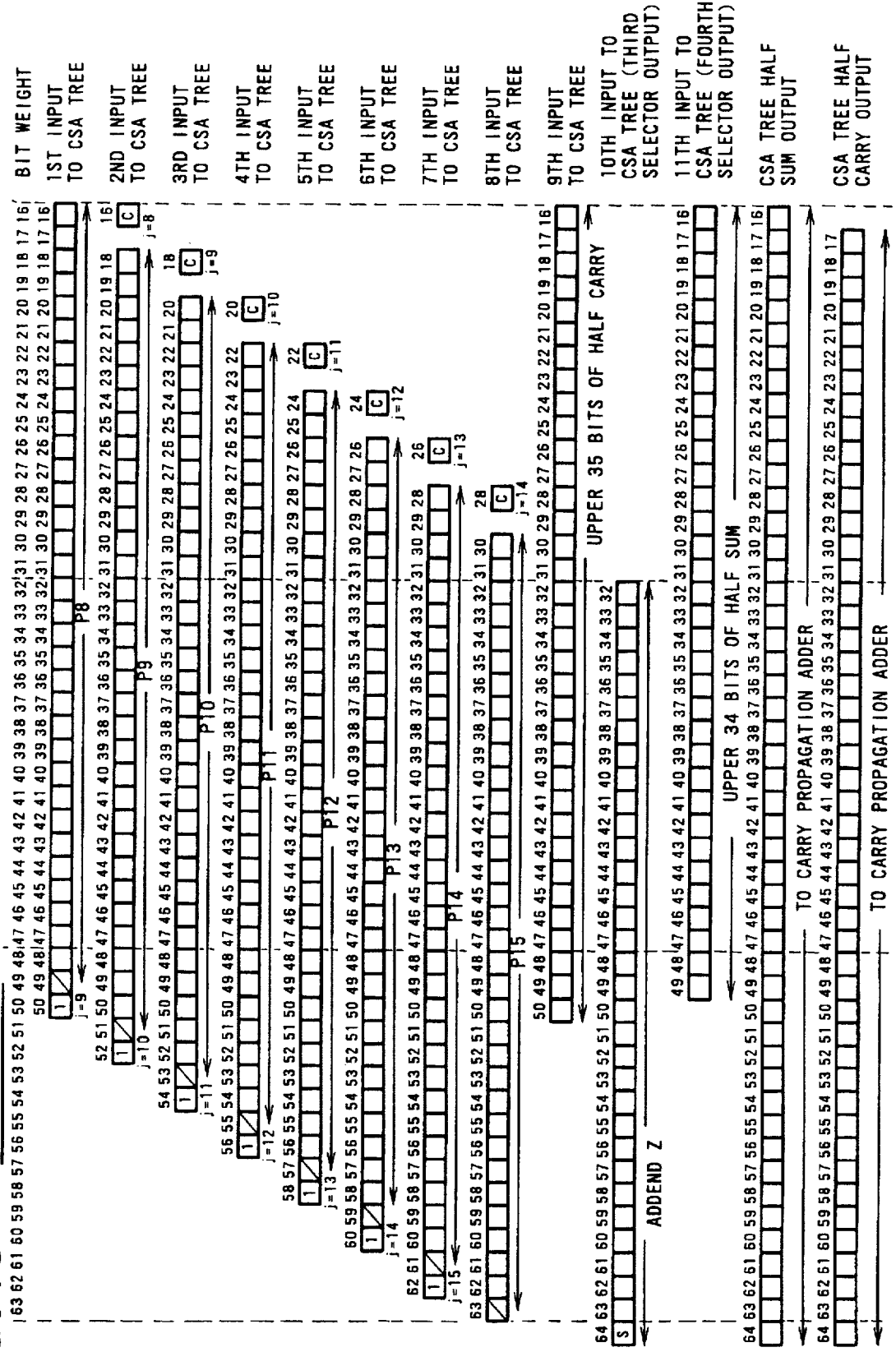
FIG. 13 is a diagrammatic view showing a list of inputs and outputs of the 11-input CSA tree in the conventional multiply-adder unit of FIG. 11 at a second operation step.

In the conventional multiply-adder unit shown in FIG. 11, in order to add a value obtained by sign extension of the addend Z, an input for exclusive use is provided for the CSA tree (11-input CSA tree 116). In contrast, in the multiply-adder unit of FIG. 5 according to the present invention, a value obtained by sign extension of the addend Z is supplied to the CSA tree (10-input CSA tree 56) in such a procedure as described in (1) to (3) below:

(1) The value obtained by sign extension of the addend Z is divided by the bit divider 55 so that it may not overlap in bit weight with the other input values (input values corresponding to the terms in equation (13)).

(2) Two values of the output of the bit divider 55 are concatenated with the other input values.

(3) The "value obtained by sign extension of the addend Z" which has been divided in (1) and concatenated with the other input values in (2) is supplied divisionally by two times at the first operation step and the second step to the CSA tree (10-input CSA tree 56).

Consequently, the number of inputs required for a CSA tree, which has conventionally been 11, can be reduced to 10. Accordingly, simplification in hardware and reduction in delay of operation (raise in speed of operation) of a CSA tree can be achieved.

It is to be noted that it can be seen from FIGS. 6 and 7 that the terms in equation (21) are included in input bits in FIGS. 6 and 7 without fail. Accordingly, values of the terms in equation (21) are inputted to and added by the 10-input CSA tree 56 at one of the first operation step and the second operation step.

Here, the manner in which as which inputs $1 \cdot 2^{(32+2j)}$ (j=0 to 16), $c_j \cdot 2^{2j}$ (j=0 to 15), $c_z$ and $c_n$ which appear in equation (21) are supplied to the 10-input CSA tree 56 is not limited to the manner illustrated in FIGS. 6 and 7. Any other manner than the manner shown in FIGS. 6 and 7 is permitted only if bits indicating the values described above ($1 \cdot 2^{(32+2j)}$ (j=0 to 16), $c_j \cdot 2^{2j}$ (j=0 to 15), $c_z$ and $c_n$) are inputted to positions of the same bit weights as those at the positions shown in FIGS. 6 and 7. Accordingly, also the values of the first constant and the second constant are not limited to those employed in the multiply-adder unit of FIG. 5.

Further, while, in the multiply-adder unit of FIG. 5, additional bit information for the partial products $P_0$ to $P_{15}$ is added by the Booth's decoder 54 side, it may otherwise be added by the 10-input CSA tree 56 side.

It is to be noted that the technique of instructing the first selector, the second selector and the third selector of information representing which one of operation at the first operation step and operation at the second operation step is proceeding is not limited to the "technique of instructing them with an operation step switch bit" as in the multiply-adder unit of FIG. 5.

Having now fully described the invention, it will be apparent to one of ordinary skill in the art that many changes and modifications can be made thereto without departing from the spirit and scope of the invention as set forth herein.

What is claimed is:

1. A multiply-adder unit having a signed multiplication function, an unsigned multiplication function and a signed fixed point multiply addition function for binary numbers of n-bit length, n being an integer equal to or greater than 1, comprising:

a bit width extender for performing, upon unsigned operation, zero extension of one bit but performing, upon signed operation, sign extension of one bit for a multiplicand of n-bit length;

a zero extender for performing zero extension of 2 bits for a multiplier of n-bit length;

a sign extender for performing sign extension of one bit for an addend of n-bit length;

a Booth's decoder for cutting out an output of said zero extender in units of 3 bits successively shifting its cut-out start position by 2 bits toward the lower bits beginning with the uppermost bit and supplying the cut out values and an output of said bit width extender to first to (k−1)th partial product generators and a kth partial product generator so that first to (k−1)th partial products and a kth partial product are generated by said first to (k−1)th and kth partial product generators, respectively, k being an integer equal to or greater than 2;

a selector for selecting, upon unsigned operation, the kth partial product generated by said Booth's decoder but selecting, upon signed operation, the output of said sign extender; and a k-input adder tree for adding the first to (k−1)th products generated by said Booth's decoder and an output of said selector.

2. A multiply-adder unit as claimed in claim 1, wherein said Booth's decoder cuts off, upon signed operation, the uppermost two bits of the output of said zero extender.

3. A multiply-adder unit as claimed in claim 1, where a sign switch bit which represents whether signed operation should be performed or unsigned operation should be performed is supplied to said bit width extender and said selector.

4. A multiply-adder unit as claimed in claim 1, wherein n is 16.

5. A multiply-adder unit as claimed in claim 1, wherein n is 32.

6. A multiply-adder unit which receives a signed multiplicand X of 32-bit length, a signed multiplier Y of 32-bit length and a signed addend Z of 32-bit length as inputs thereto and outputs a multiply addition X×Y+Z as a result R, comprising:

a sign extender for performing sign extension of one bit for the addend Z;

a bit divider for dividing an output of said sign extender into lower 18 bits and upper 15 bits;

a first selector for selectively outputting the lower 16 bits of the multiplier Y at a first operation step and for selectively outputting the upper 17 bits of the multiplier Y at a second operation step;

a second selector for selectively outputting a second constant at the first operation step and for selectively outputting the upper 35 bits of a first value at the second operation step;

a third selector for selectively outputting a value obtained by concatenation of the lower 18 bits of an output of said bit divider and a first constant at the first operation step and for selectively outputting another value obtained by concatenation of the upper 15 bits of the output of said bit divider and the upper 34 bits of a second value at the second operation step;

a Booth's decoder for cutting out an output of said first selector in units of 3 bits successively shifting its cut-out start position by 2 bits toward the lower bits beginning with the uppermost bit and supplying the cut out values to an eighth partial product generator, a seventh partial product generator, a sixth partial product generator, a fifth partial product generator, a fourth partial product generator, a third partial product generator, a second partial product generator, and a first partial product generator so that eighth, seventh, sixth, fifth, fourth, third, second and first partial products are generated from the cut out values and the value of the multiplicand X by said eighth to first partial product generators, respectively;

a 10-input carry save adder tree for adding the first to eighth partial products generated by said Booth's decoder, outputs of said second and third selectors and an additional bit information set;

a first pipeline register for storing a half sum of an output of said 10-input carry save adder tree at the first operation step and supplying the stored value as the second value to said third selector;

a second pipeline register for storing a half carry of the output of said 10-input carry save adder tree at the first operation step and supplying the stored value as the first value to said second selector; and a carry propagation adder for performing carry propagation addition for a value obtained by concatenation of the half sum outputted from said 10-input carry save adder tree at the second operation step and the lower 16 bits of the half sum stored in said first pipeline register at the first operation step and another value obtained by concatenation of the half carry outputted from said 10-input carry save adder tree at the second operation step and the lower 15 bits of the half carry stored in said second pipeline register at the first operation step.

7. A multiply-adder unit as claimed in claim 6, wherein a sign switch bit which represents whether operation at the first operation should be performed or operation at the second operation step should be performed is supplied to said first, second and third selectors.

8. A multiply-adder unit as claimed in claim 6, wherein the first constant is a value indicating $c_z$, $c_{15} \cdot 2^{30}$ and $c_7 \cdot 2^{14}$ while the second constant is a value indicating $1 \cdot 2^{32}$ and $c_{z'}$, and at the first operation step, a bit representative of $1 \cdot 2^{(32+2j)}$ where j=1, 2, 3, 4, 5, 6, 7 and 8 is added to the partial products $P_0$, $P_1$, $P_2$, $P_3$, $P_4$, $P_5$, $P_6$ and $P_7$ and another bit representative of $c_j \cdot 2^{2j}$ where j=0, 1, 2, 3, 4, 5 and 6 is added to the partial products $P_1$, $P_2$, $P_3$, $P_4$, $P_5$, $P_6$ and $P_7$ whereas, at the second operation step, a bit representative of $1 \cdot 2^{(32+2j)}$ where j=9, 10, 11, 12, 13, 14 and 15 is added to the partial products $P_8$, $P_9$, $P_{10}$, $P_{11}$, $P_{12}$, $P_{13}$ and $P_{14}$ and another bit representative of $c_j \cdot 2^{2j}$ where j=8, 9, 10, 11, 12, 13 and 14 is added to the partial products $P_9$, $P_{10}$, $P_{11}$, $P_{12}$, $P_{13}$, $P_{14}$ and $P_{15}$.

* * * * *